(12) United States Patent
Scheuing

(10) Patent No.: US 12,504,441 B2
(45) Date of Patent: Dec. 23, 2025

(54) METHOD AND DEVICE FOR DETERMINING A ROTATIONAL FREQUENCY OF A WHEEL

(71) Applicant: Robert Bosch GmbH, Stuttgart (DE)

(72) Inventor: Jan Scheuing, Vellberg (DE)

(73) Assignee: ROBERT BOSCH GMBH, Stuttgart (DE)

( * ) Notice: Subject to any disclaimer, the term of this patent is extended or adjusted under 35 U.S.C. 154(b) by 505 days.

(21) Appl. No.: 17/917,484

(22) PCT Filed: Apr. 8, 2021

(86) PCT No.: PCT/EP2021/059208
§ 371 (c)(1),
(2) Date: Mar. 16, 2023

(87) PCT Pub. No.: WO2021/213812
PCT Pub. Date: Oct. 28, 2021

(65) Prior Publication Data
US 2024/0319226 A1    Sep. 26, 2024

(30) Foreign Application Priority Data
Apr. 20, 2020 (DE) .................... 10 2020 204 974.2

(51) Int. Cl.
*G01P 21/02* (2006.01)
*G01D 5/244* (2006.01)
*G01P 3/489* (2006.01)

(52) U.S. Cl.
CPC .......... *G01P 21/02* (2013.01); *G01D 5/24476* (2013.01); *G01D 5/24495* (2013.01); *G01P 3/489* (2013.01)

(58) Field of Classification Search
CPC .......... G01D 5/24428; G01D 5/24471; G01D 5/24476; G01D 5/24495; G01D 5/3473; G01P 21/02; G01P 3/481; G01P 3/489
See application file for complete search history.

(56) References Cited

U.S. PATENT DOCUMENTS

| | | | |
|---|---|---|---|
| 4,978,847 A | 12/1990 | Fukunaga et al. | |
| 6,155,105 A * | 12/2000 | Klenk | G01M 15/11 |
| | | | 73/114.03 |

(Continued)

FOREIGN PATENT DOCUMENTS

| | | |
|---|---|---|
| DE | 19814732 A1 | 10/1999 |
| DE | 10148093 A1 | 4/2003 |

(Continued)

OTHER PUBLICATIONS

International Search Report for PCT/EP2021/059208, Issued Jul. 9, 2021.

*Primary Examiner* — Benjamin R Schmitt
(74) *Attorney, Agent, or Firm* — NORTON ROSE FULBRIGHT US LLP

(57) ABSTRACT

A method for determining a rotational frequency of a wheel, in particular of a motor vehicle, with the aid of a rotational speed sensor including an encoder wheel assigned to the wheel and a sensor element assigned to the encoder wheel, the encoder wheel having impulse sensors that are distributed uniformly over its circumference at a distance from one another, whose flanks are detected by the sensor element for determining the rotational frequency of the encoder wheel. In the method, for the purpose of compensating for a modulation of the rotational frequency caused by an eccentricity, the encoder wheel is divided into segments, a pulse frequency of detected signal impulses is ascertained and averaged for each segment, and as a function of the averaged (Continued)

pulse frequencies, modulation parameters are determined for correcting the rotational frequency.

11 Claims, 3 Drawing Sheets

(56) References Cited

U.S. PATENT DOCUMENTS

2015/0101890 A1    4/2015  Culp et al.
2016/0291052 A1*  10/2016  Riolo ...................... G01P 3/488
2018/0259546 A1    9/2018  Corno et al.

FOREIGN PATENT DOCUMENTS

| | | |
|---|---|---|
| DE | 102018221713 A1 | 6/2020 |
| JP | H02156467 A | 6/1990 |
| JP | H06261579 A | 9/1994 |
| JP | 2011059065 A * | 3/2011 ............. G01C 21/16 |
| JP | 2016536588 A | 11/2016 |
| WO | WO-2019186756 A1 * | 10/2019 ................ H02P 6/17 |

\* cited by examiner

METHOD AND DEVICE FOR DETERMINING A ROTATIONAL FREQUENCY OF A WHEEL

FIELD

The present invention relates to a method for determining a rotational frequency of a wheel, in particular of a motor vehicle, with the aid of a rotational speed sensor including an encoder wheel assigned to the wheel and a sensor element assigned to the encoder wheel, the encoder wheel having impulse sensors that are distributed uniformly over its circumference at a distance from one another and that radially protrude from the encoder wheel, for example, and whose flanks are detected by the sensor element in the circumferential direction for the purpose of determining the rotational frequency of the encoder wheel.

The present invention further relates to a device including a control unit that carries out the above-described method when used according to its intended purpose.

BACKGROUND INFORMATION

In safety braking systems in motor vehicles, the rotational speed or the rotational frequency of one or multiple wheels of the motor vehicle is/are monitored to be able to recognize and prevent a blocking of the wheel or the like. In the control units of ABS or ESP systems, the rotational frequency is determined with the aid of a rotational speed sensor. The latter includes an encoder wheel that is coupled to the wheel and a sensor element that is a fixed part of the chassis and that is assigned to the encoder wheel. The encoder wheel has a plurality of impulse sensors that are uniformly distributed over the circumference and that radially protrude from the encoder wheel in a tooth-shaped manner and/or are designed as magnetic poles. The impulse sensors are spaced apart from one another, so that two flanks of each impulse sensor are detectable by the sensor element. The encoder wheel may be scanned optically and/or electromagnetically by the sensor element. To determine the rotational frequency, the number of the flanks detected through the established measuring interval is referenced with the time difference, measured by a control unit, between the flanks detected most recently in each case of the past and instantaneous measuring interval.

It is, however, also possible that the encoder wheel has an eccentricity due to manufacturing, by which a sinusoidally modeled partition error has an effect on the time difference between the detected flanks. Amplitude and phasing are a function of the individual encoder wheel, but are not a function of speed. A static imbalance of the encoder wheel may also result in an eccentricity effect if it causes a wheel-periodic radial force that results in a wheel-periodic modulation of the dynamic rolling radius via the mechanical system of the position of the wheel and also has an effect similar to a sinusoidally modeled partition error. In contrast to the eccentricity due to manufacturing, this, however, typically also results in a change in the amplitude and phasing as a function of the rotational speed.

A method is described in German Patent Application No. DE 10 2018 221 713, in which an optimal filter is used for the purpose of compensating for a modulation resulting from the eccentricity, and the modulation parameters of the optimal filter are adapted by a sequential method of least squares. This method results in a relatively slow behavior, by which a phase delay of the compensation signal, which is a function of the speed, during steady operation and an overcompensation during the dynamic pass-through of an imbalance frequency range may result.

SUMMARY

A method according to the present invention may have an advantage that the above-mentioned disadvantages are overcome and an improved method for ascertaining the modulation parameters of a rotation-periodic modulation caused by an eccentricity or wheel imbalance is created in a frequency signal scanned in a time-equidistant manner. According to an example embodiment of the present invention, this may be achieved in that, to compensate for a modulation of the rotational frequency caused by an eccentricity, the encoder wheel is divided into segments, a pulse frequency of detected signal impulses is ascertained and averaged for each segment, and in that as a function of the averaged pulse frequencies, modulation parameters are determined for correcting the rotational frequency. In the present case, a "segment" is in particular understood to mean a segment that is defined or delimited by an angle, i.e., an angle segment. A pulse frequency, which results from the detected signal impulses that are generated by the impulse sensor or detected by the sensor element, is ascertained for the predefined (angle) segments of the encoder wheel in each case. These pulse frequencies are moreover averaged over time. The eccentricity of the encoder wheel may be derived from the averaged pulse frequencies, so that same may be used for determining the modulation parameters.

According to one preferred refinement of the present invention, the pulse frequency is detected multiple times and then averaged for the purpose of averaging the pulse frequencies of the particular segment for a particular segment over a predefinable time period or a predefinable number of rotations of the encoder wheel. Particularly preferably, the pulse frequencies are averaged algorithmically via a simple arithmetical averaging, weightings or also geometrical averaging methods being alternatively or additionally usable.

According to one preferred specific example embodiment of the present invention, the encoder wheel is divided into equally sized segments. Particularly preferably, the encoder wheel is divided into four equally sized segments (quadrants), so that a symmetrical division of the encoder wheel is present in such a way that two of the segments are diametrically opposite in each case. Alternatively, the encoder wheel is divided into differently sized segments, for example into four differently sized segments, of which for example two have the same size in each case. In general, a smaller number of segments, for example three segments, or more than four segments is possible.

According to one preferred refinement of the present invention, pulse frequencies that are free from eccentricities are ascertained from the averaged pulse frequencies of segments that are diametrically opposite to one another. It is thus assumed that the mean value of the pulse frequencies or the averaged pulse frequencies of opposite segments are considered to be free from eccentricities.

The pulse frequencies that are subject to eccentricities are preferably ascertained from the averaged pulse frequencies of adjacent segments, i.e., in the direction of rotation of consecutive segments. A linear acceleration is assumed, in particular, which allows for the instantaneous pulse frequency that is free from eccentricities as well as the pulse frequency that is subject to eccentricities to be estimated sufficiently well.

Furthermore, according to an example embodiment of the present invention, it is preferably provided that the modulation parameters are determined from the relationship of the averaged pulse frequencies that are subject to eccentricities and that are free from eccentricities. In particular, the modulation parameters are estimated in a segment-alternating manner upon leaving a segment from the relationship between the mean segment frequency, or the averaged pulse frequency, that is subject to eccentricities and the one that is free from eccentricities.

The modulation parameters preferably describe the absolute value and phasing of the eccentricity of the encoder wheel.

Alternatively, the modulation parameters are described as complex-valued amplitude $A_R+iA_I$.

It is further provided that the modulation parameters are subjected to a smoothing filtering, in particular with the aid of a PT1 filter. It is thus achieved, in particular, that the modulation parameters are not completely re-estimated multiple times per rotation, but that a preceding estimation is used and adapted with the aid of the instantaneous evaluation.

In a device according to an example embodiment of the present invention, a control unit is specially configured to carry out the method according to the present invention when used according to its intended purpose. This results in the advantages already mentioned above.

In the following, the present invention is to be elucidated in further detail with reference to the figures.

DETAILED DESCRIPTION OF EXAMPLE EMBODIMENTS

Figure 1:
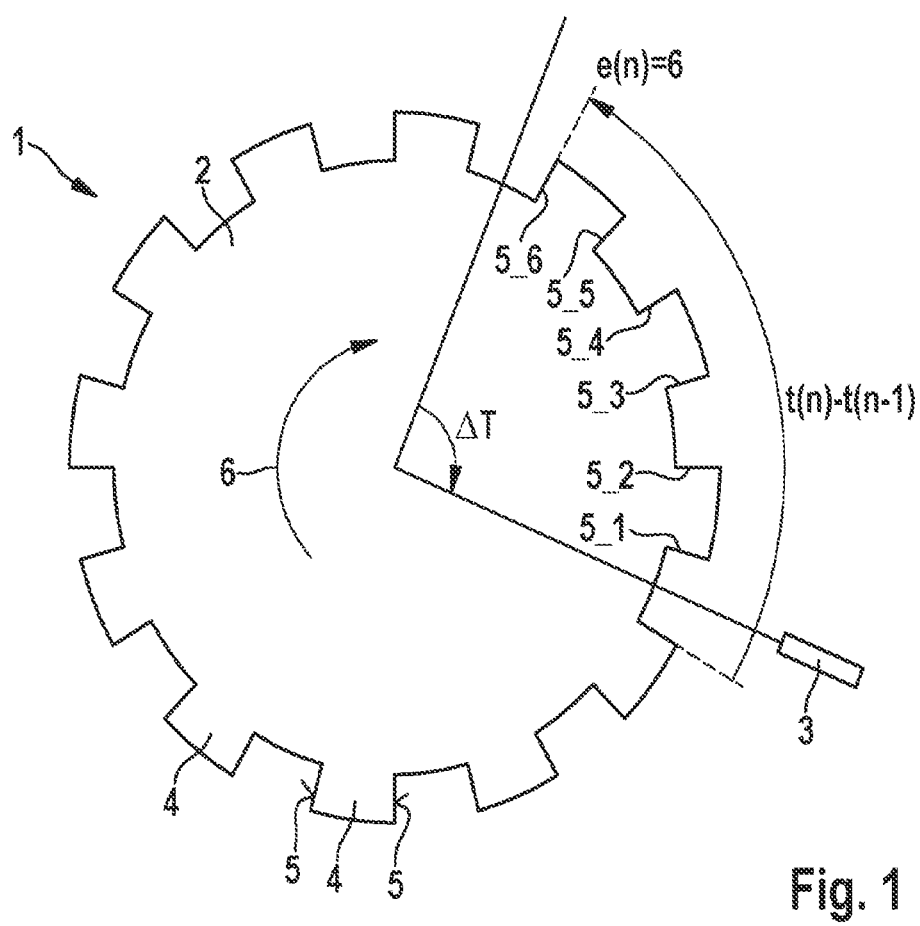
FIG. 1 shows a rotational speed sensor for a motor vehicle in a simplified illustration.

FIG. 1 shows in a simplified illustration a rotational speed sensor 1 for a motor vehicle. Rotational speed sensor 1 includes an encoder wheel 2, to which a sensor element 3 is assigned. Sensor element 3 is radially assigned to the outer circumference of encoder wheel 2 and is situated fixedly in a housing. Encoder wheel 2 is coupled torque-proof to a shaft, for example a driving wheel of the motor vehicle. Encoder wheel 2 has multiple impulse sensors 4 that are distributed uniformly over its circumference at a distance from one another. In the present exemplary embodiment, same are designed as radially protruding circular ring segments or teeth that are delimited in the circumferential direction by two flanks 5 in each case. Alternatively, impulse sensors 4 are, for example, designed as magnetic poles of a magnetic multi-pole wheel, axial teeth and/or apertures. In the present case, encoder wheel 2 is a pole wheel including a plurality of pole pairs Np that are in particular formed by one or multiple permanent magnets. Instantaneous rotational frequency f of the wheel or of encoder wheel 2 is in particular determined with the aid of a control unit, in particular an ABS/ESP control unit, at a point in time n*ΔT in that number e of flanks 5 of encoder wheel 2 or of impulse sensors 4 detected in an established measuring interval ΔT at ΔT=5 ms, for example, by sensor element 3 is referenced with the time difference, measured by the control unit, between the flanks of preceding and instantaneous measuring interval t(n)–t(n–1) detected most recently in each case. In the present exemplary embodiment, six flanks 5_1 through 5_6 are detected within measuring interval ΔT with the aid of sensor element 3, encoder wheel 2 rotating clockwise in the paper plane according to arrow 6.

As a result of the form of a computational model described in the following and simplified in FIG. 2, the impairment or the modulation caused by the eccentricity is advantageously compensated for in a time-equidistant frequency signal.

Figure 2:
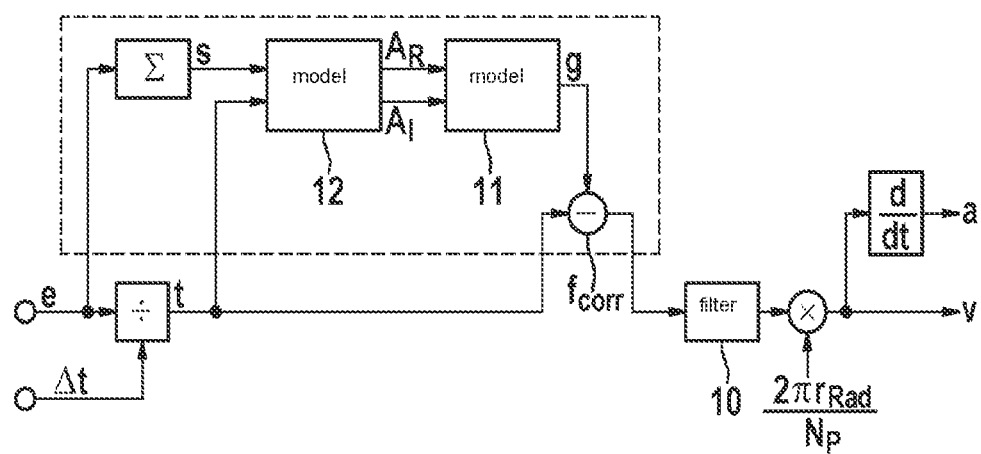
FIG. 2 shows a schematic model for explaining an advantageous method for operating the rotational speed sensor, according to an example embodiment of the present invention.

For this purpose, FIG. 2 shows a model in a simplified manner that is carried out in particular by a control unit of the rotational speed sensor or a control unit assigned to the rotational speed sensor.

Sensor element 3 is used to ascertain a pulse frequency f that results from the flanks of impulse sensor 4 and the rotational speed and that is scaled via encoder wheel pole number Np on the circular frequency:

$$f(n) = \frac{e(n)}{t(n) - t(n-1)} \quad (1)$$

German Patent Application Application No. DE 10 2018 221 713 compensates for the modulation generated by the imbalance or eccentricity via a model 12 or alternatively to its absolute value and its phasing upon the estimation of its complex-valued amplitude $A_R+iA_I$. For this purpose, as in the above-mentioned patent application, following correction signal g(n) is used:

$$g(n) = f_M(n) \cdot (A_R \cdot \cos s(n) + A_I \cdot \sin s(n)) \quad (2)$$

Parameter $f_M$ represents in this case a chronologically averaged pulse frequency and s(n) represents the instantaneous wheel angle determined through the accumulation of the flank number:

$$s(n) = \frac{2\pi}{N_P} \cdot \left[ \left( \sum_{i=0}^{n} e(i) \right) \bmod N_P \right] \quad (3)$$

With the aid of the method or model illustrated in a simplified manner in FIG. 2, the measured frequency signal is, in contrast, assigned depending on the wheel angle at the point in time of the measurement to a segment or angle segment, in particular a quadrant of encoder wheel 2 and one of the modulation parameters from the relationship of frequency mean values computed segment-wise is ascertained in each case upon leaving a segment. This results in a merely minor phase shift that does not require a chronologically averaged frequency and thus responds dynamically to changes in speed, by which the compensation for the modulation is improved. The algorithmic effort is reduced at the same time.

Figure 3A:
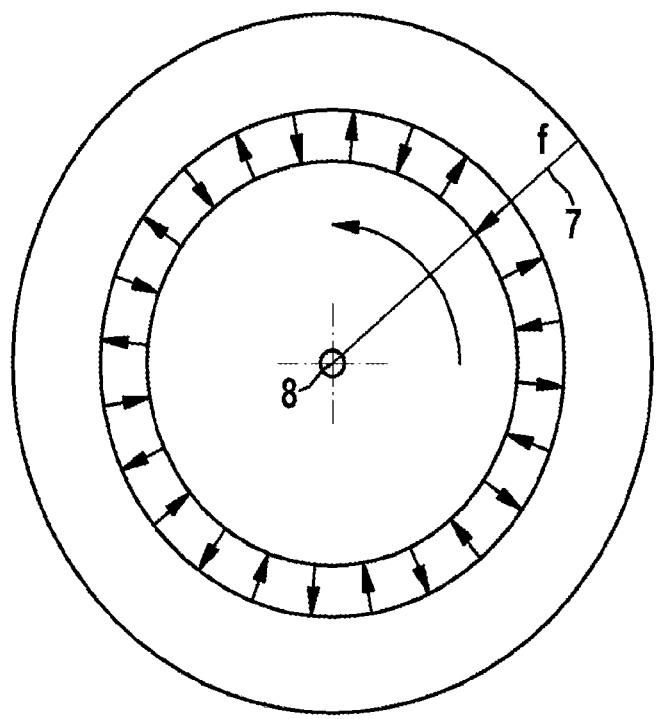
FIGS. 3A and 3B show a simplified illustration of the computational model, according to an example embodiment of the present invention.
Figure 3B:
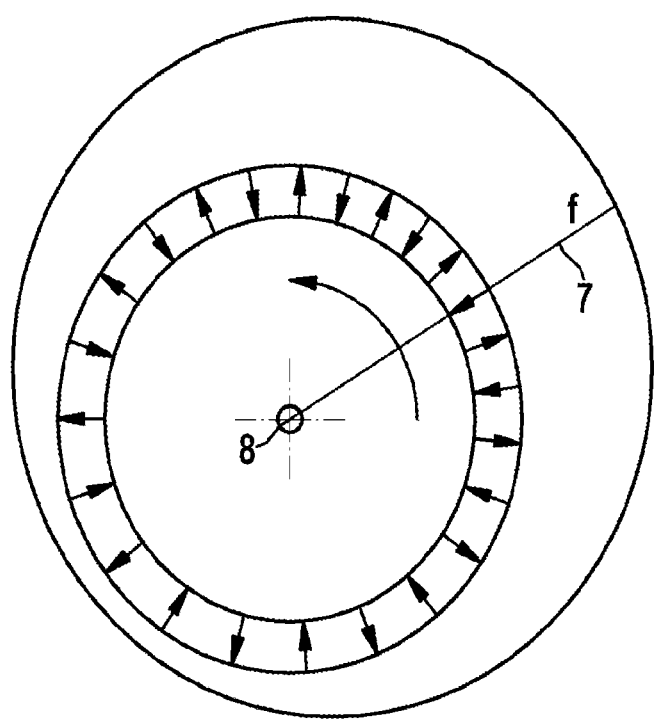

The model from FIG. 2 is to be elucidated in greater detail based on FIGS. 3A and 3B. The instantaneous pulse frequency is understood to be a function of the wheel angle in the present case. A cursor 7 that rotates at the wheel circle frequency and whose length of pulse frequency f and whose angle position represents the wheel angle position, describes at constant speed and in the case of concentric encoder wheel 2, as shown in FIG. 3A, a circle that is concentric to coordinate origin 8. Cursor 7 thus has the same length in a manner that is not a function of the wheel angle.

In the case of an eccentricity of the encoder wheel, as shown in FIG. 3B, the central point of the circle is, however, shifted away from coordinate origin 8, so that the length of cursor 7 varies as a function of the wheel angle, thus modulating measured pulse frequency f in a rotation-periodic manner. In the case of accelerated movement, the cursor describes a circular spiral. An eccentricity is characterized by the shift of the spiral central point away from origin 8.

As a result of the accumulation of the flank number, an instantaneous wheel angle s (n) is computed, as already described above. The measured instantaneous pulse frequency results from $$f(n) = \frac{e(n)}{t(n) - t(n-1)} \quad (4)$$

and is assigned to a segment I through IV in each case. The assignment preferably takes place as shown in the following table:

| | |
|---|---|
| $s(n) \leq \frac{\pi}{4}$ or $s(n) > 7\pi/4$ | I |
| $\pi/4 < s(n) \leq 3\pi/4$ | II |
| $3\pi/4 < s(n) \leq 5\pi/4$ | III |
| $5\pi/4 < s(n) \leq 7\pi/4$ | IV |

This results for the representation of the complex cursor cos s(n)+I sin s(n) in the complex plane in that the segment mean values are located on the positive real, the positive imaginary, the negative real, or the negative imaginary, axis. This simplifies the assignment of the segments to the adapted modulation parameters. While according to the present exemplary embodiment the encoder wheel is divided into four equally sized (angle) segments I through IV (quadrants), it is provided according to a further exemplary embodiment that the segments are differently sized or also that there is a different number of segments, at least three, however, which then, however, require a weighting for the assignment to the modulation parameters.

The assignment preferably takes place on the central wheel angle of the pulse frequency, i.e., the above-mentioned wheel angle computation at the end of a time interval n is corrected as follows:

$$s(n) = \frac{2\pi}{N_P} \cdot \left[ \left( \sum_{i=0}^{n} e(i) \right) - \frac{e(n)}{2} \bmod N_P \right] \quad (6)$$

Instantaneous pulse frequency f1 through f4 measured during each pass-through of each segment is preferably averaged. For this purpose, an arithmetic averaging that is implementable algorithmically particularly simply takes place, other weightings or a geometric averaging being alternatively also possible, for example. For example, segment K (K=1 through 4) is passed through at points in time $n_A, \ldots, n_E$, then, at point in time $n_E$, a mean frequency $f_k(n_e)$ is formed for segment k:

$$f_k(n_E) = \frac{1}{n_E - n_A + 1} \cdot \sum_{i=n_A}^{n_E} f(i) \quad (7)$$

The mean values from the pulse frequencies of opposite segments 1, 3, and 2, 4 may be assumed to be free of eccentricities. In the case of the above-mentioned assignment at constant rotational speed, (f1+f3)/2 as well as (f2+f4)/2 are good estimations of a pulse frequency that is free of eccentricities.

Under the assumption of a linear acceleration that is usually sufficiently approximated within a halfway wheel rotation the mean value of the pulse frequencies of adjacent segments is a good estimation of the instantaneous pulse frequency that is free of eccentricities; pulse frequency $(f_k-1+f_k+1)/2$ that is free of eccentricities may be assigned to torque frequency $f_K$ that is subject to eccentricities.

Modulation parameters $A_R$ and $A_I$ are preferably estimated in a segment-alternating manner upon leaving a segment from the relationship between the averaged pulse frequency that is subject to eccentricities and that is free from eccentricities.

| | |
|---|---|
| Segment transition IV -> I | $A_I = 1 - \dfrac{2 f_3}{f_2 + f_4}$ |
| Segment transition I -> II | $A_R = \dfrac{2 f_4}{f_1 + f_3} - 1$ |
| Segment transition II -> III | $A_I = \dfrac{2 f_1}{f_2 + f_4} - 1$ |
| Segment transition III -> IV | $A_R = 1 - \dfrac{2 f_2}{f_1 + f_3}$ |

In this case, the averaged pulse frequencies measured most recently in each case are used. It is preferable, as shown above, that the evaluation is delayed by a quarter of a rotation, so that the averaged pulse frequencies of segments II, III, and IV that were passed through most recently, are used upon leaving segment IV, for example.

Figure 4:
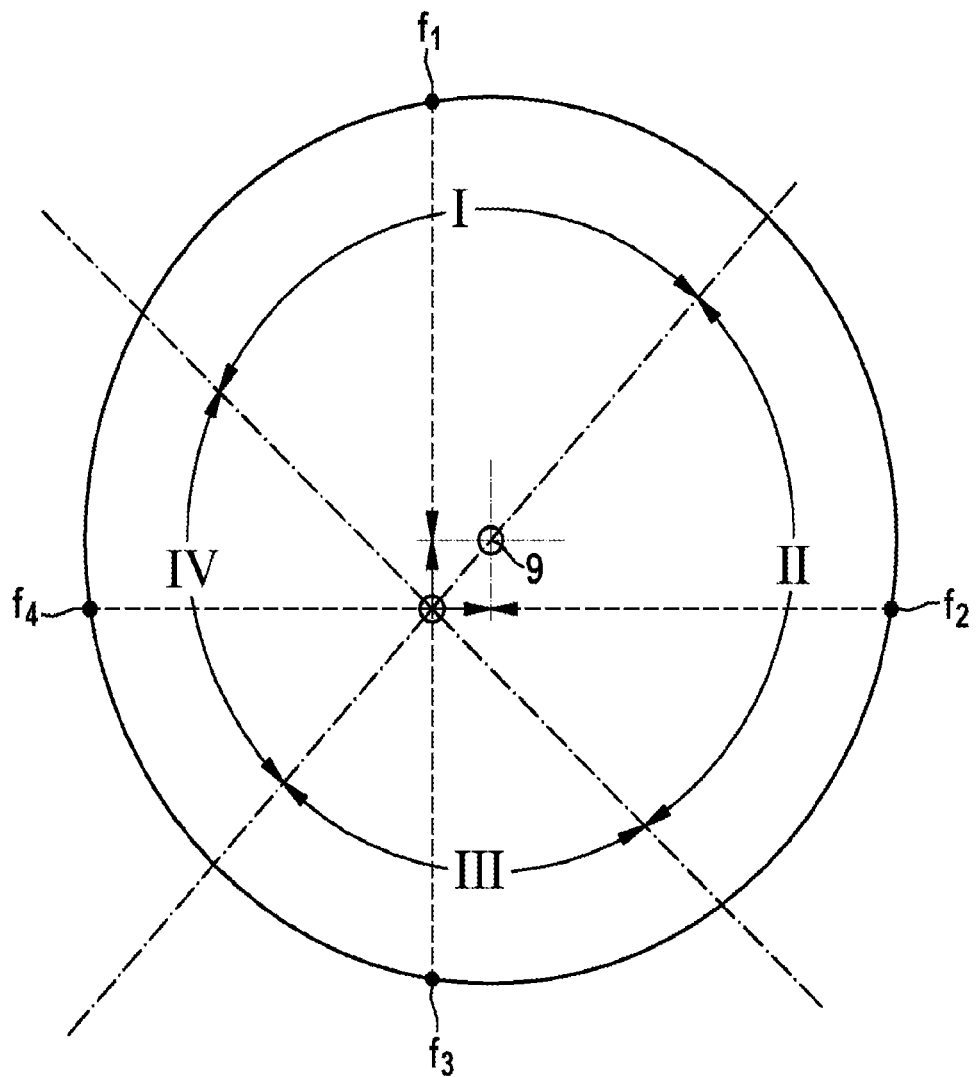
FIG. 4 shows a geometric illustration of the computational model, according to an example embodiment of the present invention.

The method may be explained geometrically as shown in FIG. 4. The instantaneous pulse frequency plotted about origin 8 is assigned to one of four segments I through IV. Segments I through IV are shown in FIG. 4 by dash-dotted lines and double arrows. For each segment I through IV, an averaged pulse frequency $f_1$ through $f_4$ is ascertained. The bisecting of the secants between the averaged pulse frequencies of the opposite segments, as is shown by dashed lines, have approximately the length of the circle radius representing the pulse frequency that is free of eccentricities. The orthogonals of the bisecting of the secants may be used to determine central point 9 of the pulse frequency circle. The shift of origin 8 and circle central point 9 with reference to the circle radius corresponds to the modulation parameters to be estimated in amplitude and phase with regard to the real and imaginary part.

The above-described evaluation preferably subsequently passes through a smoothing filtering with the aid of filter 10, as is shown in FIG. 2, for example a PT1 filter, having a portion of 30% of the new evaluation, so that the modulation parameters do not have to be completely re-estimated twice per rotation of encoder wheel 2 in each case. Instead, a preceding estimation is advantageously adapted through the evaluation. The estimated modulation parameters and the instantaneously measured pulse frequency are thus used to compute via a model 11 correction signal g, so that the rotation-periodic modulation is compensated for in corrected signal $f_{corr}(n)=f(n)-g(n)$.

Velocity v and acceleration a may then be easily and conventionally determined from the thus modulated and corrected signal.

What is claimed is:

1. A method for determining a rotational frequency of a wheel of a motor vehicle, using a rotational speed sensor including an encoder wheel assigned to the wheel and a sensor element assigned to the encoder wheel, the encoder wheel having impulse sensors that are distributed uniformly over its circumference at a distance from one another, the method comprising:
    detecting flanks, by the sensor element, to determine the rotational frequency of the encoder wheel; and
    compensating for a modulation of the rotational frequency caused by an eccentricity by:
        dividing the encoder wheel into segments;
        ascertaining a pulse frequency of detected signal impulses;
        averaging the ascertained pulse frequency for each segment;
        determining, as a function of the averaged pulse frequencies, modulation parameters determined for correcting the determined rotational frequency, wherein:
        the pulse frequencies that are free from eccentricities are ascertained from the averaged pulse frequencies of the segments that are diametrically opposite to one another.

2. The method as recited in claim 1, wherein, in the averaging step of the pulse frequencies of each segment, the pulse frequency is detected multiple times and then averaged for each segment over a predefinable time period or a predefinable number of rotations of the encoder wheel.

3. The method as recited in claim 1, wherein, in the dividing step, the encoder wheel is divided into equally sized.

4. The method as recited in claim 1, wherein, in the dividing step, the encoder wheel is divided into at least three segments.

5. The method as recited in claim 1, wherein, in the dividing step, the encoder wheel is divided into four segments.

6. The method as recited in claim 1, wherein the pulse frequencies that are subject to eccentricities are ascertained from the averaged pulse frequencies of adjacent segments.

7. The method as recited in claim 1, wherein the modulation parameters are determined from a relationship of the averaged pulse frequencies that are subject to eccentricities and those that are free from eccentricities.

8. The method as recited in claim 1, wherein the modulation parameters describe an absolute value and phasing of the eccentricity of the encoder wheel.

9. The method as recited in claim 1, wherein the modulation parameters are subjected to a smoothing filtering using a PT1 filter.

10. The method as recited in claim 1, wherein, in the dividing step, the encoder wheel is divided into differently sized segments.

11. A device for determining a rotational frequency of a wheel of a motor vehicle, using a rotational speed sensor including an encoder wheel assigned to the wheel and a sensor element assigned to the encoder wheel, the encoder wheel having impulse sensors that are distributed uniformly over its circumference or at a distance from one another, whose flanks are detectable by the sensor element for determining the rotational frequency, the device comprising:
    a control unit configured to:
        compensate for a modulation of the rotational frequency caused by an eccentricity by:
            dividing the encoder wheel into segments;
            ascertaining a pulse frequency of detected signal impulses;
            averaging the ascertained pulse frequency for each segment;
            determining, as a function of the averaged pulse frequencies, modulation parameters determined for correcting the determined rotational frequency,
        wherein:
            the pulse frequencies that are free from eccentricities are ascertained from the averaged pulse frequencies of the segments that are diametrically opposite to one another.

* * * * *